United States Patent [19]
Belford

[11] 3,832,989
[45] Sept. 3, 1974

[54] CHARCOAL FIREBOX
[76] Inventor: Robert O. Belford, 7114 Oliver Ave. South, Minneapolis, Minn. 55423
[22] Filed: Sept. 10, 1973
[21] Appl. No.: 396,077

[52] U.S. Cl............ 126/25 R, 99/421 HV, 126/147
[51] Int. Cl.......................... A47j 37/04, F24b 3/00
[58] Field of Search........ 126/25 R, 25 A, 9 R, 147, 126/25 B; 110/1 F; 99/421 H, 421 HH, 421 R, 421 V, 421 HV, 421 M

[56] References Cited
UNITED STATES PATENTS

| 175,050 | 3/1876 | Dejey .............................. 99/421 M |
|---|---|---|
| 3,079,909 | 3/1963 | Bemben ............................ 126/25 R |
| 3,175,549 | 3/1965 | Bergsten ........................... 126/25 R |
| 3,182,585 | 11/1965 | Rensh et al. .................. 99/421 H X |
| 3,237,621 | 3/1966 | Staley................................ 126/25 R |
| 3,247,827 | 4/1966 | Cremier ............................ 126/25 R |

FOREIGN PATENTS OR APPLICATIONS
554,483  1/1957  Belgium ........................... 99/421 M Primary Examiner—William F. O'Dea
Assistant Examiner—Harold Joyce
Attorney, Agent, or Firm—Williamson, Bains & Moore

[57] ABSTRACT

A charcoal firebox for use as an accessory with a rotisserie, brazier or the like comprises a metallic enclosure for a layer of burning coals, the enclosure defined by a grill removably mounted to an open face pan. The grill is formed of spring tensionable material and is spaced from and confronts the central reflector plate of the pan, the spacing between grill anc central plate being less at the bottom of the grill than at the top so that an unburned or newly ignited coal fits easily between plate and grill at the top of the grill but such coals at the bottom of the grill bow the grill forwardly outwardly from the central plate, spring tensioning the grill and generating a grill restoring force causing the lower end of the grill to exert rearwardly directed force on the adjacent coals, retaining them against the central plate as the spring tensioned grill bottom moves rearwardly to follow the coals toward the central plate retaining them against the central plate as the coals are reduced in size by combustion; this structure assures that coals adjacent the top of the grill do not drop to the bottom until the coals adjacent the bottom are substantially reduced in size thereby preserving the single layer depth of coals for a prolonged period.

Divider ribs on the central reflector plate divide the enclosure into three compartments, permitting burning coals to be concentrated in one or more of these compartments for improved cooking efficiency. The firebox has a handle assembly extending forwardly from the pan to permit the pan to be placed at various angles relative to the rotisserie to achieve improved cooking results. The handle assembly is weighted sufficiently that when the handle assembly is raised and lowered relative to a horizontal plane to change the angle of the pan relative to the plane, the pan will not tip rearwardly. Support means is mounted to the handle assembly and is extendable toward the brazier bowl to retain the handle at a plurality of predetermined distances above the brazier, controlling the angle between pan and brazier bowl for optimum cooking results.

8 Claims, 4 Drawing Figures

CHARCOAL FIREBOX

SUMMARY OF THE INVENTION

The invention relates to the field of charcoal braziers or rotisseries and comprises a firebox for use in the bowl of a rotisserie or brazier for retaining a single layer depth of burning coals to cook an adjacent food product.

The invention comprises an open face, generally upright pan to which a grill is selectively removably mounted in angled relationship relative thereto, the spacing between a central reflector plate of the pan and the grill being such as to permit a maximum of a single coal depth between grill and central reflector plate.

A pair of upright divider ribs spaced laterally from one another on the central reflector plate and extending forwardly, outwardly therefrom toward the grill divide the interior of the enclosure into three compartments in one or more of which burning coals may be contained to direct heat on predetermined sections of an adjacent food product.

A pair of arms is fixed to the pan adjacent the bottom thereof and extends outwardly therefrom, the free ends of the arms being interconnected by an insulative handle, permitting an operator to easily manipulate the pan enclosure.

The grill is formed of spring tensionable material and is angled relative to the central reflector plate with the bottom of the grill being nearer the central reflector plate than the top. The spacing between grill and plate at the grill bottom is less than the thickness of a substantially unburned coal so that when the pan is filled with newly ignited coals the bottom section of the grill will bow elastically forwardly from the central plate, spring tensioning the grill to exert a rearwardly directed force on the coals, retaining them against the central plate and moving rearwardly with the coals as the coals are reduced in size by combustion, thus assuring that coals adjacent the top of the grill do not drop to the bottom until coals adjacent the bottom are substantially reduced in size, thereby preserving a single layer depth of coals for a prolonged period.

It is desirable to maintain a single coal depth of burning coals because this is all that is needed for effective even cooking and such a depth uses minimal fuel.

The firebox is constructed to be used in the bowl of a commercially available rotisserie and may be positioned in a generally upright position, a supine position, or various angled positions therebetween. The handle assembly of the firebox has arms extending from the pan at right angles to the central reflector plate and generally parallel to one another. The handle assembly is weighted sufficiently to provide a counter balancing effect such that when the handle assembly is raised and lowered relative to the bowl of the rotisserie to change the angle of the pan relative to the bowl, the pan will not tip rearwardly. Accordingly, the position of the handle assembly determines the position of the enclosure. A telescoping wand or like means is mounted to the handle assembly and is extendable toward the bowl to retain the handle at a plurality of predetermined distances above the bowl to thereby control the angle between pan and bowl for improved cooking results.

The hot coals are completely contained within the enclosure of the invention and permit the operator to position them in the optimum location to cook the adjacent food product. When cooking has been completed, the enclosure can be easily removed from the rotisserie bowl and the coals extinguished, the enclosure storing the coals for future reuse.

The firebox invention is easily and inexpensively manufactured, rugged and long lasting, and extremely reliable, providing improved cooking results and securely and safely retaining the burning coals during use. These and other advantages will appear from the following description and the appended drawings in which corresponding elements carry identical reference numerals in the separate figures.

MAIN DESCRIPTION

Figure 1:
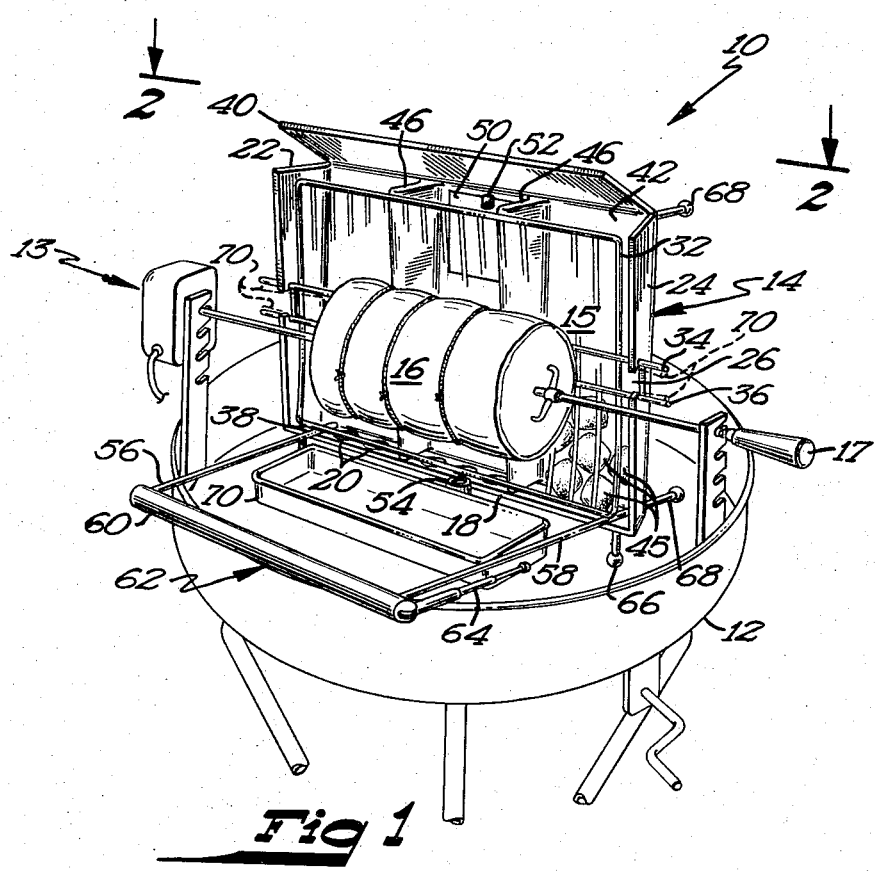
FIG. 1 is a front perspective view showing an embodiment of the charcoal firebox invention in upright position in the bowl of a rotisserie.
Figure 2:
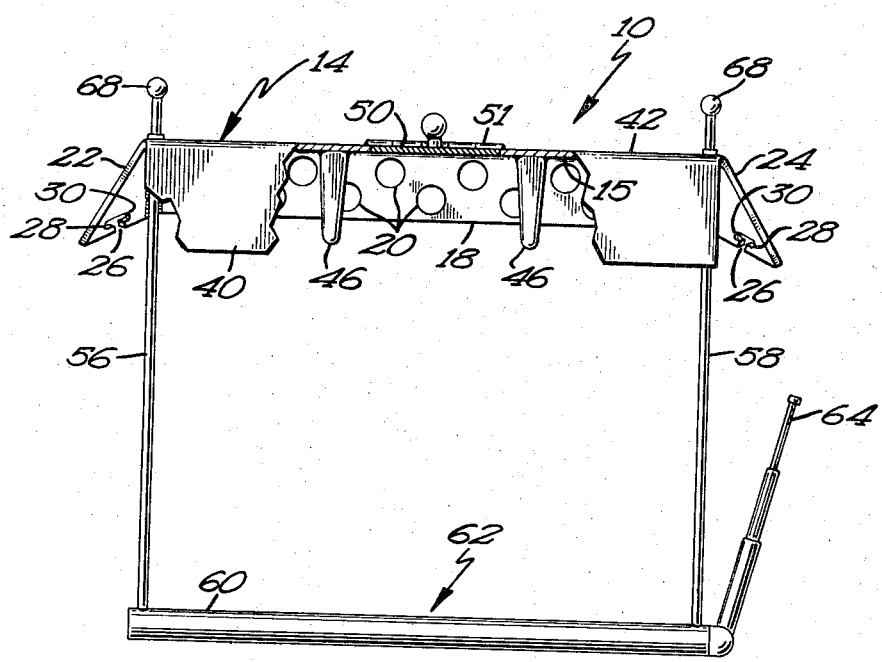
FIG. 2 is a top elevation view of the embodiment of the invention shown in FIG. 1 taken in the direction of arrows 2—2.

Referring now to FIG. 1, a charcoal firebox 10, embodying the invention, is shown positioned in the bowl 12 of a commercially available rotisserie 13.

The firebox 10 has an open face, generally upright pan 14 formed from metallic material by stamping or other means known to the art. The pan 14 includes a central heat reflector plate 15 which provides support for coals 45 within the pan and reflects the heat from the burning coals in a forwardly direction toward food product 16 on the spit 17.

Figure 3:
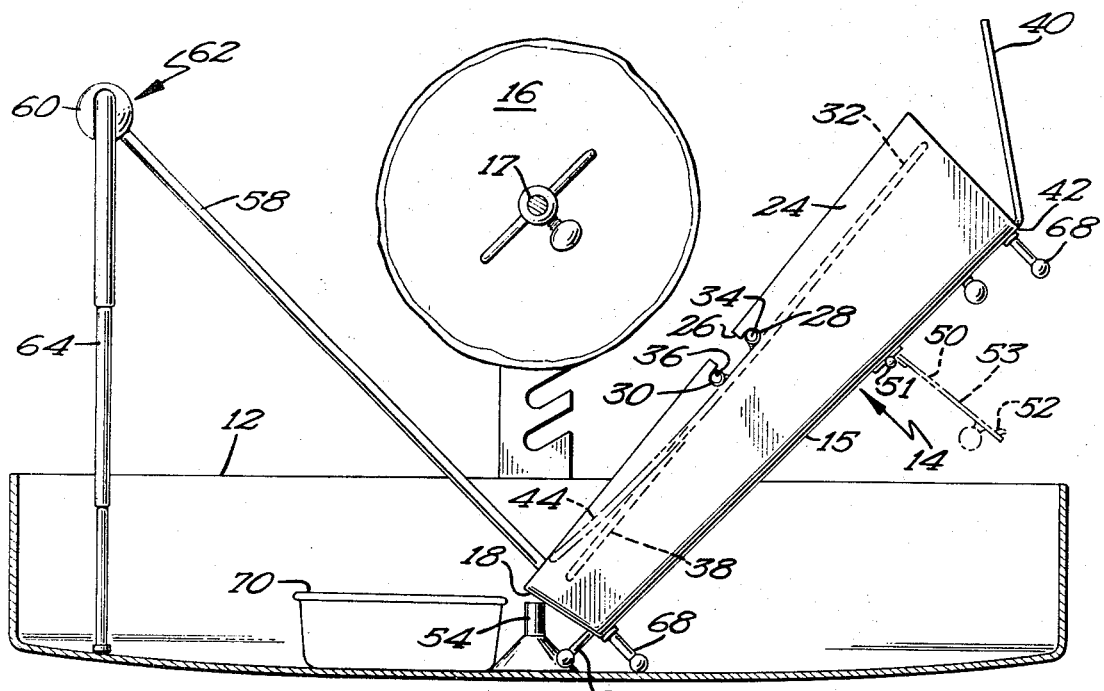
FIG. 3 is a side elevation view of an embodiment of the invention in which the enclosure is angled relative to the bowl to heat a food product by both convection and radiation.

The pan 14 also includes a lower panel 18 integral with and extending forwardly from the central plate 15. If desired, the panel 18 may be positioned at a right angle to the central plate 15 or alternatively may be oriented at a downward angle, as shown in FIG. 3, to provide an inclined slope from the central plate 15. The panel 18 provides a floor-like structure to support the coals 45 within the firebox when the firebox is in the upright position shown in FIG. 1. A plurality of perforations 20 are formed in the lower panel 18 to permit ashes to drop therethrough to the floor of the bowl 12 and also to provide a draft from the bowl into the hot lower coals contained within the firebox.

The pan 14 further includes left and right side panels 22 and 24 joined to and extending forwardly and outwardly from central reflector plate 15. The angle between the side panels 22 and 24 and central plate 15 is selected to reflect the heat of the coals in pan 14 forwardly toward the food product 16.

Each of the side panels 22 and 24 has a slot 26 at the forward edge thereof, the slot extending rearwardly toward the central plate 15. A lower notch 30 extends downwardly from the slot 26, and an upper notch 28 is positioned above and forwardly of the lower notch 30.

A grill 32, formed of spring tensionable interconnecting metal rods, cooperates with the central reflector plate 15, left and right side panels 22 and 24 and lower panel 18 to define an enclosure for coals therebetween. The grill 32 has a pair of vertically spaced, upper and lower bars 34 and 36, respectively, extending horizontally outwardly from each lateral side of the grill 32, the bars being formed of spring tensionable material.

To mount the grill 32 on the pan 14, an operator urges the ends of the bars 34 and 36 toward one another to the phantom positions 70 (FIG. 1), and then inserts them into the slots 26 in left and right side panels 22 and 24, releasing the bars and permitting them to return to untensioned condition as they engage upper and lower notches 28 and 30 in each side panel. The upper notch 28 is positioned forwardly of the lower notch 30 so the grill will be inclined relative to the central reflector plate 15, the distance between plate and grill being greatest at the top of the grill.

When the pan 14 has been filled with a single layer depth of standard, commercially available coals 45 and the grill 32 retained by the notches 28 and 30, the lower end 38 of the grill is bowed forwardly by the coals to position 44 (FIG. 3), causing it to become spring tensioned and to exert a rearwardly directed force against the adjacent coals. Because the distance between the central reflector plate 15 and the lower end 38 of the grill 32 is less than the thickness of a single unburned coal, the grill is forced forwardly to position 44 when the grill is installed against coals in the pan 14, causing a restoring force to be generated by the spring tensioned grill 32 which retains coals which are adjacent the bottom of the grill against the central reflector plate 15. As the coals 45 shrink from combustion the grill 32 moves rearwardly toward plate 15, retaining the coals in engagement with the reflector plate 15 and preventing other coals adjacent the top of the grill from dropping downwardly. Accordingly, this engagement between grill 32 and coals adjacent the bottom 38 of the grill ensures that a single layer depth of coals is retained adjacent the bottom of the grill for a prolonged period. When the coals become so reduced in size that they can fall through perforations 20 they drop down into the bowl and coals nearer the top of the pan drop downwardly taking the places of the burned out coals.

An upper reflector panel 40 extends from the upper end 42 of central plate 15 forwardly and upwardly therefrom, the upper panel 40 being spaced from the grill 32 to form a gap therebetween through which additional new coals may be tossed into the enclosure, the upper panel 40 receiving the coals thereagainst and reflecting them downwardly into the enclosure. Accordingly the panel 40 serves several purposes, viz., serving as a guide to direct coals into the enclosure as they are tossed against the panel 40, serving as a reflector for heat from the coals to direct it toward the food product 16 on the spit 17, and providing containment for the coals within the enclosure when the pan 14 is placed in the supine position of FIG. 4 wherein the reflector plate 15 is generally horizontal.

A pair of generally upright divider ribs 46 is positioned on the rear reflector plate 15, extending toward and confronting the grill 32 to define three compartments within the enclosure. Each rib extends forwardly from the plate 15 to provide a barrier to confine burning coals. Accordingly the coals may be confined in any of the three compartments to concentrate heat on particular portions of the food product 16. If, for example, the food product is a roast whose center is substantially thicker than the ends, the center compartment between the ribs 46 might be filled with coals to provide concentrated heating on the center of the roast at the end of the roasting cycle to ensure even cooking. The ribs 46 may be attached to the surface of the reflector plate 15 by any known means, or alternatively may be forwardly directed protrusions of the reflector plate 15 formed by stamping. Although the ribs are shown in the drawings as extending substantially to the grill 32, it should be understood that they need extend outwardly from plate 15 only enough to prevent coals moving laterally past them and need not extend so far outwardly as shown in the drawings. It should also be understood that the term rib, as used herein, is intended to include any barrier means effective to subdivide the enclosure into compartments.

The central reflector plate 15 is provided with a bowl post orifice 48 adjacent the top 42, the orifice 48 having a door 50 hinged to the reflector plate 15 by hinges 51. A catch 52 retains the door 50 in closed position shown in FIG. 1. When it is desirable to orient the charcoal firebox 10 in a supine position with the reflector plate 15 in a generally horizontal position (FIG. 4) the door 50 is swung to the open position 53 (FIG. 3) and bowl post 54, centrally located in the bowl of most commercially available braziers, is positioned uprightly through the orifice 48, permitting the firebox to be oriented horizontally without risk of the instability which might occur if the firebox were balanced on a post 54.

A pair of sturdy metallic arms 56 and 58 is fixed to pan 14 and extends forwardly from the pan 14, the arms being generally parallel to one another and perpendicular to the central reflector plate 15. The arms 56 and 58 are shown attached to the lower panel 18 by welding, although any known means of attachment may be used and is within the purview of the invention. A handle 60 is fixed between the free ends of the arms 56 and 58 and may be provided with an insulative coating to permit it to be more comfortably handled when hot coals are present in the enclosure. The handle 60 is weighted to provide a counterweight effect to provide additional stability and safety for the firebox 10. The arms 56 and 58 and handle 60 collectively comprise a handle assembly 62 having sufficient weight that when the handle assembly is raised and lowered relative to the bowl 12 to change the angle of the pan 14 relative to the bowl, the pan 14 will not tip rearwardly. Accordingly, the position of the handle assembly 62, which is controlled by an operator, determines the orientation of the firebox.

Support means, in the form of telescoping wand 64 is pivotally mounted to the handle 60 for movement about the longitudinal axis of the handle 60 and is telescopically extendable outwardly from the handle 60 towards the bowl 12 to permit the handle 60 to be retained at a plurality of predetermined distances above the bowl, thereby controlling the angle between the plate 15 and the bottom of bowl 12 for optimum cooking results. Accordingly, when the pan is to be oriented at an angle to the horizontal, as shown in FIG. 3, the telescoping wand 64 is extended adequately to support the handle at the shown position of FIG. 3, thereby retaining the pan in the desired angular position.

Generally upright legs 66 extend downwardly from the pan 14 at lateral sides thereof, the legs 66 raising the level of the enclosure to the top of the bowl 12 to permit maximum utilization of the heat on a product 16 to be cooked.

Figure 4:
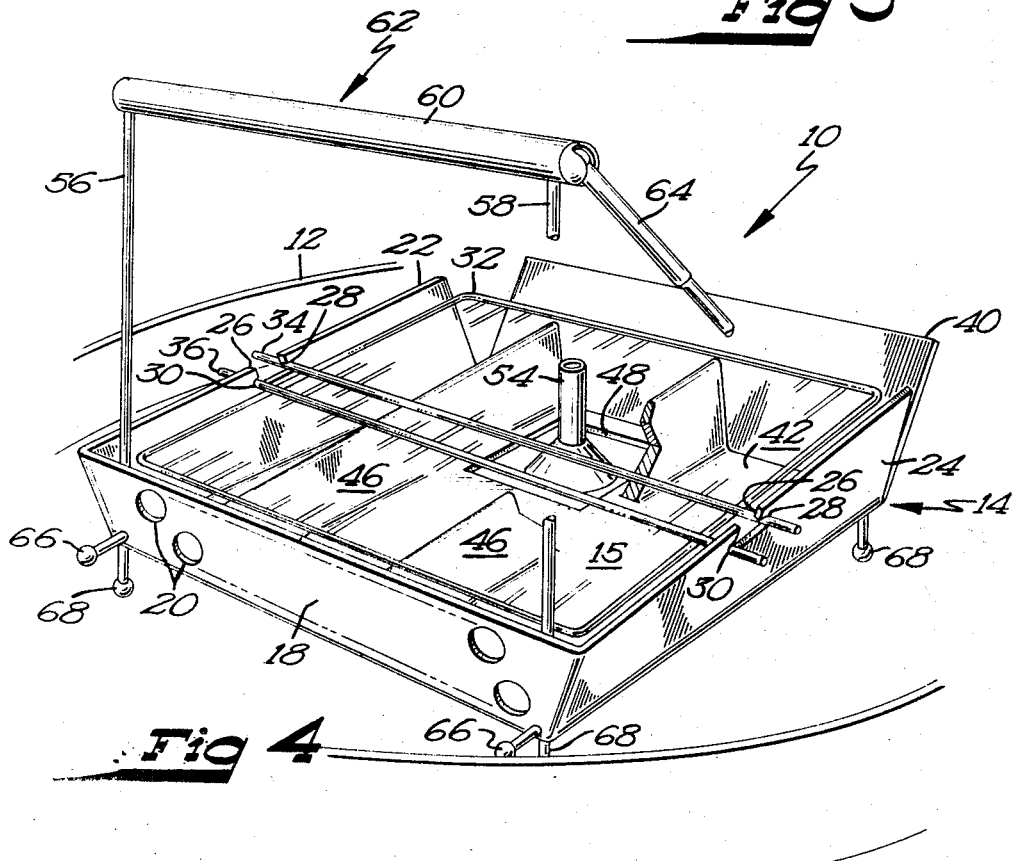
FIG. 4 is a perspective view of the embodiment of FIG. 1 showing the enclosure in a supine position in the bowl of the rotisserie.

Four rearwardly directed legs 68 extend from the corners of the central plate 15 to raise the level of the enclosure to the top of the bowl 12 when the plate 15 is oriented horizontally as best shown in FIG. 4. The legs 66 and 68 may be formed of metallic material and attached to the firebox in any manner known to the art, so long as they provide elevation for the firebox to raise it to the desired distance above the bottom of the bowl 12.

In operation, the operator, before using the firebox 10, positions it with the central reflector plate 15 in generally horizontal, supine position and squeezes the ends of the upper and lower bars 34 and 36 of grill 32 toward one another to the position 70. He then withdraws grill 32 from slot 26, the ends of the bars clearing the upper and lower notches 28 and 30 of the slot.

The operator next places a supply of commercially available standard size coal or charcoal briquettes in the pan, the coals resting on the now horizontally oriented reflector plate 15, the supply being sufficient to provide a single layer depth of coals in the pan. After igniting the coals by any known means, such as teepeeing, electrical ignition, or the like, the coals are spread out in the pan so as to form a single layer depth on the plate 15. The door 50 is placed in a closed position and the catch 52 secured to retain it, thereby preventing the escape of the coals 45 from the pan.

The operator now squeezes the ends of the upper and lower bars 34 and 36 toward one another to the position 70 and reinserts them in the slot 26, permitting the upper bar to fit into the notch 28 and the lower bar into the notch 30 of each side panel 22 and 24. In placing the bar in the lower notches 30, the lower portion 38 of the grill 32 becomes spring tensioned, being bowed outwardly to position 44 by the coal between it and the plate 15, as best shown in FIG. 3.

The firebox 10 is now substantially ready for operation and the operator grasps the handle assembly 62, swinging the firebox to an upright orientation, such as that shown in FIG. 1, or angled orientation like that shown in FIG. 3. If the orientation of FIG. 1 is selected, the ends of the handle 62 may be supported on the bowl 12, the generally upright legs 66 raising the level of the firebox adjacent to the top of the bowl with the central reflector plate 15 in generally upright orientation with the coals 45 confronting the spit 17. If it is desired that the firebox be angled relative to the floor of the bowl 12, the operator raises the handle assembly 62 to the desired height above the floor of the bowl and extends the telescoping wand 64 downwardly to contact the floor of the bowl 12 thereby retaining the handle assembly 62 at the desired position. Since the handle assembly is weighted to counterbalance the firebox and prevent the enclosure and charcoal therein from tipping rearwardly, the enclosure remains in the selected position. In the angled orientation of FIG. 3, the coal-filled enclosure provides both radiant heat and convection heat to the spit 17, yet the juices from the food product 16 on spit 17 do not drop into the enclosure and instead may be easily captured in a dish 70 and used for gravy, basting or the like.

The structure of the firebox 10 assures that the burning coals remain in single layer depth for a period substantially greater than that with any commercially available firebox because of the spring tensioned grill 32, which exerts a rearwardly directed force on the coals, retaining them against the reflector plate 15 to assure that coals adjacent the top of the enclosure cannot immediately drop downwardly. The grill 32 in returning to unflexed position follows the coals 45 inwardly as they shrink from combustion until the coals are substantially reduced and drop through the perforations 20 of the lower panel 18. When the lower coals are substantially reduced, the larger coals adjacent the top of the enclosure drop downwardly filling the narrow lower end of the enclosure. At such time, the operator may obtain additional unburned coals, and toss them into the gap between upper panel 40 and the grill 32, bouncing them off the panel 40 downwardly into the enclosure, the panel 40 preventing the escape of coals rearwardly of the enclosure. These newly added coals are readily ignited by the substantial heat of the coals still remaining in the enclosure.

At times it is desirable to orient the firebox such that the central plate 15 is in a horizontal or supine position beneath the food product 16 to be cooked. To do so the operator opens the door 50, swinging it downwardly, clear of the orifice 48. The operator now swings the handle assembly 62 to a generally upright position like that shown in FIG. 4 wherein the plate 15 is generally horizontal and the upright post 54 of the brazier fits through and within the orifice 48, substantially filling the orifice and preventing the escape of coals 45 therefrom. In the shown position of FIG. 4, the rearwardly extending legs 68 support the pan at a level with the reflector plate 15 at the top of bowl 12, placing the coals closely adjacent the spit 17. Since the telescoping wand 64 is not needed when the firebox 10 is in the orientation of FIG. 4, the wand is telescoped inwardly to the closed position shown in FIG. 4 and aligned parallel with the arm 58. The firebox 10 may alternatively be placed on the top of the standard horizontal grill supplied with commercially available braziers and adjusted upwardly or downwardly with the horizontal grill to vary the heat applied to a food product.

When cooking has been completed and it is desired to extinguish the burning coals 45, the operator lifts the firebox 10 by means of the handle assembly 62 and carries it to a convenient location for extinguishing. For example, if the cooking is being done outdoors, as is typical with such apparatus, the firebox may be brought to a convenient extinguishing point and the sand hose used to extinguish the coals while in the enclosure. The coals may be left within the enclosure and safely retained, making them readily available when the firebox is to be used again. Typically, when coals are extinguished, the smaller cinderlike unusable coals drop away leaving only those large enough for future burning.

Accordingly, the invention provides a convenient and safe enclosure for containing burning charcoal during cooking operations and may be used in a plurality of angular positions to achieve optimum cooking results.

While the preferred embodiments of the present invention have been described, it should be understood that various changes, adaptations and modifications may be made therein without departing from the spirit of the invention and the scope of the appended claims.

What is claimed is:

1. A charcoal firebox, useable in the bowl of a brazier, for retaining burning coals to cook an adjacent food product comprising:

an open face generally upright pan including a central heat-reflecting plate, a lower panel fixed to said plate and extending forwardly from said central reflector plate at the bottom of said plate, and left and right side panels joined to and extending forwardly from said central reflector plate at lateral sides of said central reflector plate;

a grill selectively removably mounted to said left and right side panels forwardly of and confronting said central plate and cooperating with said pan to define an enclosure positionable within the bowl for containing burning coals therein, said grill spaced from said central reflector plate to contain a layer of coals between said grill and said central plate;

a pair of divider ribs spaced laterally from one another on said central reflector plate, each of said ribs extending from substantially the bottom to the top of said central reflector plate and extending forwardly outwardly from said central plate to define three coal compartments, permitting the burning coals to be concentrated in certain of said compartments; and a handle assembly including a pair of arms connected to said pan adjacent said lower panel and extending forwardly therefrom and further including an insulative handle fixed between the free ends of said arms to permit an operator to manipulate said enclosure by using said handle.

2. The charcoal firebox of claim 1 and further including an upper reflector panel joined to the upper edge of said central reflector plate and extending upwardly and forwardly therefrom, said upper panel spaced from said grill to form a gap therebetween through which additional coals may be tossed into said enclosure, said upper panel receiving coals tossed through said gap and directing them downwardly into said enclosure.

3. The firebox of claim 1 wherein said grill is formed of spring tensionable material and is inclined relative to said central reflector plate such that the distance between said plate and said grill is less at the bottom of said grill than at the top, the distance between said central plate and the bottom of said grill being less than the thickness of an unburned coal so that coals in said pan adjacent the bottom of said grill will elastically bow the grill forwardly outwardly from said central plate, spring tensioning the grill to exert a rearwardly directed force on said coals, retaining them against said central plate, said bowed grill moving rearwardly to follow the coals toward said central plate to retain them against said central plate as the coals are reduced in size by combustion, thus assuring that coals adjacent the top of said grill do not drop to the bottom until the coals adjacent the bottom of said grill are substantially reduced in size to thereby preserve the single layer depth of coals for a prolonged period.

4. The firebox of claim 1 wherein:

said grill has a pair of vertically spaced upper and lower bars having ends extending horizontally outwardly from each lateral side of said grill, said bars being formed of spring tensionable material;

each said side panel has a slot and upper and lower bar receiving notches along said slot to confine the ends of said grill bars, an upper notch being positioned vertically above and forwardly of the lower notch; and said bars becoming tensioned when the adjacent ends thereof are urged toward one another by an operator and returning to untensioned condition when released, adjacent ends of said pairs of bars being releasably contained in said notches with said upper bar being contained in said upper notch and said lower bar being contained in said lower notch of each side panel.

5. The charcoal firebox of claim 1 wherein said central reflector plate includes a bowl post orifice adjacent the top thereof to permit said central plate to be lowered upon and positioned about the bowl post when said central plate is in supine position in the bowl of the brazier, and a door pivotally mounted to said central plate to selectively obstruct said orifice.

6. The charcoal firebox of claim 1 wherein said arms extend from said pan at right angles to said central reflector plate and are generally parallel to one another, said handle assembly being weighted sufficiently that when said handle assembly is raised and lowered relative to a horizontal plane to change the angle of said pan relative to the horizontal plane, said pan does not tip rearwardly, and support means mounted to said handle assembly and extendable toward the bowl to retain said handle at a plurality of predetermined distances above the bowl to control the angle between pan and bowl for optimum cooking results.

7. The charcoal firebox of claim 6 wherein said support means is a telescoping wand pivotally mounted to said handle assembly for swinging movement in a generally upright plane.

8. In combination with a charcoal-burning brazier having a bowl and a spit, an improved charcoal firebox for retaining burning coals to cook a food product on the spit comprising:

an open face generally upright pan including a central heat-reflecting plate, a lower panel affixed to said pan and extending forwardly from said central reflector plate at the bottom of said plate, left and right side panels joined to and extending forwardly from said central reflector plate at lateral sides of said central reflector plate;

a grill selectively removably mounted to said left and right side panels forwardly of and confronting said central plate and cooperating with said pan to define an enclosure positioned within the bowl for containing burning coals therein, said grill spaced from said central reflector plate to contain a layer of coals between said grill and said central plate;

at least one divider rib positioned on said central reflector plate and extending generally uprightly from substantially the bottom to the top of said central reflector plate and extending forwardly outwardly from said central plate to define a plurality of coal compartments permitting the burning coals to be concentrated in certain of said compartments; and a handle assembly including a pair of arms connected to said pan adjacent said lower panel and extending forwardly therefrom and further including an insulative handle fixed between the free ends of said arms to permit an operator to manipulate said enclosure by using said handle.

* * * * *